United States Patent
Bishop et al.

(10) Patent No.: US 9,220,156 B2
(45) Date of Patent: Dec. 22, 2015

(54) LIGHTING CONTROL APPARATUS AND PROCESS

(71) Applicant: ORGANIC RESPONSE INVESTORS PTY. LTD., Richmond, Victoria (AU)

(72) Inventors: Daniel John Bishop, St. Kilda (AU); Christopher Robert Duffield, Richmond (AU)

(73) Assignee: ORGANIC RESPONSE INVESTORS PTY LTD., Richmond, Victoria (AU)

(*) Notice: Subject to any disclaimer, the term of this patent is extended or adjusted under 35 U.S.C. 154(b) by 0 days.

(21) Appl. No.: 14/421,727

(22) PCT Filed: Aug. 13, 2013

(86) PCT No.: PCT/AU2013/000892
§ 371 (c)(1),
(2) Date: Feb. 13, 2015

(87) PCT Pub. No.: WO2014/026226
PCT Pub. Date: Feb. 20, 2014

(65) Prior Publication Data
US 2015/0208490 A1    Jul. 23, 2015

(30) Foreign Application Priority Data
Aug. 13, 2012    (AU) .............................. 2012903471

(51) Int. Cl.
*H05B 37/02*    (2006.01)
*G08C 17/02*    (2006.01)

(52) U.S. Cl.
CPC ............ *H05B 37/0272* (2013.01); *G08C 17/02* (2013.01); *H05B 37/0227* (2013.01); *H05B 37/0281* (2013.01)

(58) Field of Classification Search
CPC ............... G08B 25/10; G08B 13/2491; G08B 13/1436; G08B 21/22

USPC ......... 340/539.1, 539.22, 539.26, 539.3, 541, 340/545.2, 547, 545.3, 551, 552, 561, 565, 340/567; 315/247, 224, 185 S, 149–159, 315/291, 307–326
See application file for complete search history.

(56) References Cited

U.S. PATENT DOCUMENTS

| | | | |
|---|---|---|---|
| 7,529,594 B2 | 5/2009 | Walters et al. | |
| 2011/0241877 A1* | 10/2011 | Wedig | G08B 7/066 340/540 |
| 2012/0112667 A1 | 5/2012 | Mohan et al. | |
| 2013/0321163 A1* | 12/2013 | Brenner | G08B 13/1436 340/686.6 |
| 2014/0191876 A1* | 7/2014 | Wedig | G08B 7/066 340/628 |

FOREIGN PATENT DOCUMENTS

EP     2 451 252     5/2012
WO    WO 2011/134003    11/2011

OTHER PUBLICATIONS

International Search Report for PCT/AU2013/000892, mailed Nov. 4, 2013, 9 pages.

* cited by examiner

*Primary Examiner* — Tuyet Vo
(74) *Attorney, Agent, or Firm* — Nixon & Vanderhye P.C.

(57) ABSTRACT

A lighting control apparatus for controlling one or more light sources, the lighting control apparatus including: at least one sensor for detecting or sensing a parameter of interest; a transmitter for transmitting one or more wireless signals to one or more other lighting control apparatuses; a receiver for receiving one or more wireless signals from one or more other lighting control apparatuses; and a controller having at least one processor and a memory in communication with the processor to store configuration data representing one or more processes to be executed by the processor; wherein the stored configuration data represents one or more processes that, when executed by the processor, causes the processor to: receive, via the receiver, configuration update data representing one or more further processes to be executed by the processor; and modify the stored configuration data to represent the one or more further processes to be executed by the processor.

22 Claims, 8 Drawing Sheets

LIGHTING CONTROL APPARATUS AND PROCESS

This application is the U.S. national phase of International Application No. PCT/AU2013/000892, filed 13 Aug. 2013, which designated the U.S. and claims priority to Australia Application No. 2012903471, filed 13 Aug. 2012, the entire contents of each of which are hereby incorporated by reference.

TECHNICAL FIELD

The present invention relates to systems and methods for controlling the illumination output of lighting based on environmental sensing, and in particular to a lighting control apparatus and process for configuring and operating a lighting control apparatus.

BACKGROUND

Existing lighting systems such as those used for relatively large (e.g., office) installations suffer from a number of difficulties, including complex and expensive installation and wasted energy when unoccupied spaces are illuminated. Additionally, although the centralised nature of prior art addressable lighting systems in theory facilitates their configuration, in practice this process is complex and time-consuming, with control engineers spending time mapping virtual components to their real counterparts, and ensuring that the various systems and components are correctly communicating with one another. This can obfuscate the step of directly programming the operation of individual lights or lighting zones to optimise lighting and energy usage while also providing occupant satisfaction.

It is desired to provide a lighting control apparatus and related processes that alleviate one or more difficulties of the prior art, or at least provide a useful alternative to existing lighting systems and processes.

SUMMARY

In accordance with some embodiments of the present invention, there is provided a lighting control apparatus for controlling one or more light sources, the lighting control apparatus including:
  at least one sensor for detecting or sensing a parameter of interest;
  a transmitter for transmitting one or more wireless signals to one or more other lighting control apparatuses;
  a receiver for receiving one or more wireless signals from one or more other lighting control apparatuses; and
  a controller having at least one processor and a memory in communication with the processor to store configuration data representing one or more processes to be executed by the processor;
  wherein the stored configuration data represents one or more processes that, when executed by the processor, causes the processor to:
    receive, via the receiver, configuration update data representing one or more further processes to be executed by the processor; and
    modify the stored configuration data to represent the one or more further processes to be executed by the processor.

In some embodiments, the stored configuration data represents a process that, when executed by the processor, causes the processor to transmit, via the transmitter, configuration update data representing one or more processes to be executed by one or more other lighting control apparatuses.

In some embodiments, the stored configuration data represents at least one process that, when executed by the processor, causes the processor to:
  receive, via the receiver, a request for configuration information representing a configuration of the lighting control apparatus; and
  responsive to receipt of said request, transmit the requested configuration information.

In accordance with some embodiments of the present invention, there is provided a lighting control apparatus for controlling one or more light sources, the lighting control apparatus including:
  at least one sensor for detecting or sensing a parameter of interest;
  a transmitter for transmitting one or more wireless signals to one or more other lighting control apparatuses;
  a receiver for receiving one or more wireless signals from one or more other lighting control apparatuses; and
  a controller having at least one processor and a memory in communication with the processor to store configuration data representing one or more processes to be executed by the processor;
  wherein the stored configuration data represents one or more processes that, when executed by the processor, causes the processor to:
    receive, from one or more other lighting control apparatuses, occupancy data representative of occupancies of respective sensing regions of the one or more other lighting control apparatuses and respective separations between a sensing region of the lighting control apparatus and said sensing regions; and
    determine a dwell time for determining when to dim or turn off the light sources in the absence of occupancy of the sensing region of the lighting control apparatus, the dwell time being determined on the basis of the separations between said sensing region of the lighting control apparatus and the sensing regions of the one or more other lighting control apparatuses.

In accordance with some embodiments of the present invention, there is provided a lighting control apparatus for controlling one or more light sources, the lighting control apparatus including:
  at least one sensor for detecting or sensing a parameter of interest;
  a transmitter for transmitting one or more wireless signals to one or more other lighting control apparatuses;
  a receiver for receiving one or more wireless signals from one or more other lighting control apparatuses; and
  a controller having at least one processor and a memory in communication with the processor to store configuration data representing one or more processes to be executed by the processor;
  wherein the stored configuration data represents one or more processes that, when executed by the processor, causes the processor to:
    receive, via the receiver, a request to test wireless communications between said lighting control apparatus and one or more other lighting control apparatuses;
    control the one or more light sources to provide a visual indication that the request was received by said lighting control apparatus; and
    transmit, via the transmitter, a corresponding request to test wireless communications for receipt by one or more other lighting control apparatuses.

In accordance with some embodiments of the present invention, there is provided a lighting control apparatus for controlling one or more light sources, the lighting control apparatus including:
- at least one sensor for detecting or sensing a parameter of interest;
- a transmitter for transmitting one or more wireless signals to one or more other lighting control apparatuses;
- a receiver for receiving one or more wireless signals from one or more other lighting control apparatuses; and
- a controller having at least one processor and a memory in communication with the processor to store configuration data representing one or more processes to be executed by the processor;
- wherein the stored configuration data represents one or more processes that, when executed by the processor, causes the processor to:
  - (i) receive, via the receiver, a request to test wireless communications between said lighting control apparatus and one or more other lighting control apparatuses;
  - (ii) transmit, via the transmitter and at a corresponding selected wireless transmission power, a test message for receipt by one or more other lighting control apparatuses;
  - (iii) receive, via the receiver, response messages confirming receipt of the test message from one or more other lighting control apparatuses;
  - repeat steps (ii) and (iii) for respective different wireless transmission powers; and
  - process the received response messages and data representing the corresponding wireless transmission powers to select a wireless transmission power for use in subsequent wireless transmissions by the transmitter.

In accordance with some embodiments of the present invention, there is provided a lighting control apparatus for controlling one or more light sources, the lighting control apparatus including:
- at least one sensor for detecting or sensing a parameter of interest;
- a transmitter for transmitting one or more wireless signals to one or more other lighting control apparatuses;
- a receiver for receiving one or more wireless signals from one or more other lighting control apparatuses; and
- a controller having at least one processor and a memory in communication with the processor to store configuration data representing one or more processes to be executed by the processor;
- wherein the stored configuration data represents one or more processes that, when executed by the processor, causes the processor to:
  - transmit, via the transmitter, messages to one or more other lighting control apparatuses, each transmitted message including zone data identifying the node as being a member of at least one corresponding zone of a plurality of zones;
  - receive, via the wireless receiver, messages from one or more other lighting control apparatuses, each received message including zone data identifying a corresponding one of said plurality of zones; and
  - determine how to process each received message based on one or more rules stored in the memory and defining how a received message is to be processed by the processor based on the zone associated with the message.

In accordance with some embodiments of the present invention, there is provided a lighting control apparatus for controlling one or more light sources, the lighting control apparatus including:
- at least one sensor for detecting or sensing a parameter of interest;
- a transmitter for transmitting one or more wireless signals to one or more other lighting control apparatuses;
- a receiver for receiving one or more wireless signals from one or more other lighting control apparatuses; and
- a controller having at least one processor and a memory in communication with the processor to store configuration data representing one or more processes to be executed by the processor;
- wherein the stored configuration data represents one or more processes that, when executed by the processor, causes the processor to:
  - monitor the output of the motion detector over time, and based on said monitoring, determine a threshold value for use in processing the output of the motion detector at subsequent times to determine whether motion has been detected at said subsequent times.

In accordance with some embodiments of the present invention, there is provided a lighting control apparatus for controlling one or more light sources, the lighting control apparatus including:
- at least one sensor for detecting or sensing a parameter of interest;
- a transmitter for transmitting one or more wireless signals to one or more other lighting control apparatuses;
- a receiver for receiving one or more wireless signals from one or more other lighting control apparatuses; and
- a controller having at least one processor and a memory in communication with the processor to store configuration data representing one or more processes to be executed by the processor;
- wherein the stored configuration data represents one or more processes that, when executed by the processor, causes the processor to:
  - monitor the output of the motion detector over time, and based on said monitoring, determine whether the motion detector is faulty; and
  - if said determining determines that the motion detector is faulty, ignoring output of the motion detector at subsequent times.

In accordance with some embodiments of the present invention, there is provided a lighting control apparatus for controlling one or more light sources, the lighting control apparatus including:
- at least one sensor for detecting or sensing a parameter of interest;
- a transmitter for transmitting one or more wireless signals to one or more other lighting control apparatuses;
- a receiver for receiving one or more wireless signals from one or more other lighting control apparatuses; and
- a controller having at least one processor and a memory in communication with the processor to store configuration data representing one or more processes to be executed by the processor;
- wherein the stored configuration data represents one or more processes that, when executed by the processor, causes the processor to:
  - receive, via the wireless receiver, an instruction to reset a timer of the controller; and
  - control the power applied to the light sources based on the state of the timer, wherein a first power is applied to the light sources when the timer has not expired, and a second power different to the first power is applied to the light sources after the timer has expired.

In some embodiments, the stored configuration data represents at least one process that, when executed by the processor, causes the processor to:
control the transmitter to transmit one or more wireless signals representing information indicating that a parameter of interest has been detected in response to the at least one sensor detecting a parameter of interest.

In some embodiments, the stored configuration data represents at least one process that, when executed by the processor, causes the processor to:
control the transmitter to transmit one or more wireless signals representing information indicating that a parameter of interest has been detected in response to the receiver receiving one or more wireless signals representing information indicating that a parameter of interest has been detected.

In some embodiments, the one or more wireless signals received by the receiver representing information indicating that a parameter of interest has been detected include information representative of a separation of the apparatus from the apparatus that detected the parameter of interest.

In some embodiments, the stored configuration data represents at least one process that, when executed by the processor, causes the processor to: control the transmitter to transmit one or more wireless signals representing information representative of a separation of the apparatus from the apparatus that detected the parameter of interest.

In accordance with some embodiments of the present invention, there is provided, in a lighting control apparatus controlling one or more light sources and including:
at least one sensor for detecting or sensing a parameter of interest;
a transmitter for transmitting one or more wireless signals to one or more other lighting control apparatuses;
a receiver for receiving one or more wireless signals from one or more other lighting control apparatuses; and
a controller having at least one processor and a memory in communication with the processor to store configuration data representing one or more processes to be executed by the processor;
a configuration process, including:
receiving, via the receiver, configuration update data representing one or more further processes to be executed by the processor; and
modifying the stored configuration data to represent the one or more further processes to be executed by the processor.

In some embodiments, the configuration process includes transmitting, via the transmitter, configuration update data representing one or more processes to be executed by one or more other lighting control apparatuses.

In some embodiments, the configuration process includes:
receiving, via the receiver, a request for configuration information representing a configuration of the lighting control apparatus; and
responsive to receipt of said request, transmitting the requested configuration information.

In accordance with some embodiments of the present invention, there is provided, in a lighting control apparatus controlling one or more light sources and including:
at least one sensor for detecting or sensing a parameter of interest;
a transmitter for transmitting one or more wireless signals to one or more other lighting control apparatuses;
a receiver for receiving one or more wireless signals from one or more other lighting control apparatuses; and
a controller having at least one processor and a memory in communication with the processor to store configuration data representing one or more processes to be executed by the processor;
a process, including:
receiving, from one or more other lighting control apparatuses, occupancy data representative of occupancies of respective sensing regions of the one or more other lighting control apparatuses and respective separations between a sensing region of the lighting control apparatus and said sensing regions; and
determining a dwell time for determining when to dim or turn off the light sources in the absence of occupancy of the sensing region of the lighting control apparatus, the dwell time being determined on the basis of the separations between said sensing region of the lighting control apparatus and the sensing regions of the one or more other lighting control apparatuses.

In accordance with some embodiments of the present invention, there is provided, in a lighting control apparatus controlling one or more light sources and including:
at least one sensor for detecting or sensing a parameter of interest;
a transmitter for transmitting one or more wireless signals to one or more other lighting control apparatuses;
a receiver for receiving one or more wireless signals from one or more other lighting control apparatuses; and
a controller having at least one processor and a memory in communication with the processor to store configuration data representing one or more processes to be executed by the processor;
a configuration process, including:
receiving, via the receiver, a request to test wireless communications between said lighting control apparatus and one or more other lighting control apparatuses;
controlling the one or more light sources to provide a visual indication that the request was received by said lighting control apparatus; and
transmitting, via the transmitter, a corresponding request to test wireless communications for receipt by one or more other lighting control apparatuses.

In accordance with some embodiments of the present invention, there is provided, in a lighting control apparatus controlling one or more light sources and including:
at least one sensor for detecting or sensing a parameter of interest;
a transmitter for transmitting one or more wireless signals to one or more other lighting control apparatuses;
a receiver for receiving one or more wireless signals from one or more other lighting control apparatuses; and
a controller having at least one processor and a memory in communication with the processor to store configuration data representing one or more processes to be executed by the processor;
a configuration process, including:
(i) receiving, via the receiver, a request to test wireless communications between said lighting control apparatus and one or more other lighting control apparatuses;
(ii) transmitting, via the transmitter and at a corresponding selected wireless transmission power, a test message for receipt by one or more other lighting control apparatuses;

(iii) receiving, via the receiver, response messages confirming receipt of the test message from one or more other lighting control apparatuses;

(iv) repeating steps (ii) and (iii) for respective different wireless transmission powers; and (v) processing the received response messages and data representing the corresponding wireless transmission powers to select a wireless transmission power for use in subsequent wireless transmissions by the transmitter.

In accordance with some embodiments of the present invention, there is provided, in a lighting control apparatus controlling one or more light sources and including:

at least one sensor for detecting or sensing a parameter of interest;

a transmitter for transmitting one or more wireless signals to one or more other lighting control apparatuses;

a receiver for receiving one or more wireless signals from one or more other lighting control apparatuses; and a controller having at least one processor and a memory in communication with the processor to store configuration data representing one or more processes to be executed by the processor;

a process, including:

transmitting, via the transmitter, messages to one or more other lighting control apparatuses, each transmitted message including zone data identifying the node as being a member of at least one corresponding zone of a plurality of zones;

receiving, via the wireless receiver, messages from one or more other lighting control apparatuses, each received message including zone data identifying a corresponding one of said plurality of zones; and determining how to process each received message based on one or more rules stored in the memory and defining how a received message is to be processed by the processor based on the zone associated with the message.

Also described herein is a lighting control apparatus for controlling one or more light sources, the lighting control apparatus including:

at least one sensor for sensing a parameter of interest;

a transmitter for transmitting one or more wireless signals to one or more other lighting control apparatuses;

a receiver for receiving one or more wireless signals from one or more other lighting control apparatuses; and a controller having a processor and a memory in communication with the processor to store configuration data that determines the processes executed by the processor.

Also described herein is a node of a plurality of nodes of a lighting system, wherein said nodes communicate with each other using peer-to-peer multi-hop wireless networking, and each node includes:

a wireless transmitter for transmitting wireless signals to other nodes of the lighting system;

a wireless receiver for receiving wireless signals from other nodes of the lighting system;

at least one sensing component configured to sense at least one characteristic of a corresponding sensing region and to generate at least one corresponding output; and a controller, the controller being configurable:

(a) to control a corresponding light source based on one or more of:

(i) the output of the sensing component; and (ii) wireless signals received from one or more others of said nodes; and (b) to transmit wireless signals for use by other ones of said nodes to control their corresponding light sources.

In some embodiments, the at least one output of the at least one sensing component includes an output indicative of human presence or absence, and when said output indicates human presence, the wireless signals transmitted by the node include wireless signals indicating to other nodes that the node has detected human presence.

In some embodiments, the wireless signals received from one or more others of said nodes include wireless signals indicating that at least one of said one or more others of said nodes has detected human presence, and the wireless signals transmitted by the node include wireless signals indicating to other nodes that the at least one other node has detected human presence.

In some embodiments, the wireless signals transmitted by the node and indicating to other nodes that the at least one other node has detected human presence include data representative of a spatial separation of the node from the at least one other node that detected human presence.

In some embodiments, the processor is configured to control the corresponding light source based on:

a. the detection of human presence in the corresponding sensing region of the node; and b. the detection of human presence by the at least one other node and the corresponding spatial separation of the node from the at least one other node that detected said human presence.

In some embodiments, the processor of each node is further configured to:

receive, via the wireless receiver of said node, configuration data representing a desired configuration of the node;

configure the node in accordance with the received configuration data; and transmit, via the wireless transmitter of the node, the received configuration data to at least one other of said plurality of nodes;

whereby said nodes include a first node that receives the configuration data and the configuration data is then forwarded to the other nodes.

In some embodiments, the processor of each node is further configured to:

receive, from a user device, and via the wireless receiver of said node, a request for configuration data representing a configuration of the node; and responsive to receipt of said request, transmit the requested configuration data to the user device via the wireless transmitter of the node.

In some embodiments, the processor of each node is further configured to:

receive, from one or more others of said nodes, occupancy data representative of occupancy of respective sensing regions of the one or more others of said nodes and of respective separations between said node and said sensing regions; and determine a dwell time for determining when to dim or turn off the light source of the node in the absence of occupancy of the sensing region of the node, the dwell time being determined on the basis of the separations between said node and said sensing regions.

In some embodiments, the processor of each node is further configured to:

receive, via the wireless receiver of said node, a request to test wireless communications between said node and one or more other nodes of said plurality of nodes;

control the light source to provide a visual indication that the request was received by said node; and transmit, via the wireless transmitter of said node, a corresponding request to test wireless communications for receipt by one or more others of said plurality of nodes;

wherein said nodes include a first node that initiates the process in response to receipt of wireless signals from a user device such that said request is propagated from said first node to other second nodes of said plurality of nodes, the visual indications provided by second nodes receiving the request providing confirmation of wireless communications therebetween, and the absence of visual indications in one or more third nodes of said plurality of nodes providing an indication of the absence of wireless communication between the second nodes and the third nodes.

In some embodiments, the processor of each node is further configured to:

transmit, via the wireless transmitter, messages to one or more others of said nodes, each transmitted message including zone data identifying the node as being a member of at least one corresponding zone of a plurality of zones;

receive, via the wireless receiver, messages from one or more others of said nodes, each received message including zone data identifying a corresponding one of said plurality of zones; and determine how to process each received message based on one or more rules defining how a received message is to be processed based on the zone associated with the message.

Also described herein is a computer-readable storage medium having stored thereon executable instructions representing a process for execution by each of a plurality of nodes of a lighting system, wherein said nodes communicate with each other using peer-to-peer multi-hop wireless networking, and each node includes:

a wireless transmitter for transmitting wireless signals to other nodes of the lighting system;

a wireless receiver for receiving wireless signals from other nodes of the lighting system;

at least one light source;

at least one sensing component configured to sense at least one characteristic of a corresponding sensing region and to generate a corresponding output; and a controller, the controller being configurable:
  (a) to control the light source based on one or more of:
    (i) the output of the sensing component, and
    (ii) wireless signals received from one or more others of said nodes; and
  (b) to transmit wireless signals for use by other ones of said nodes to control their light sources;

the process being executed by the controller of the node, and including:

receiving, via the wireless receiver of said node, configuration data representing a desired configuration of the node;

configuring the node in accordance with the received configuration data; and transmitting, via the wireless transmitter of the node, the received configuration data to at least one other of said plurality of nodes;

whereby said nodes include a first node that receives the configuration data and the configuration data is then forwarded to the other nodes.

Also described herein is a computer-readable storage medium having stored thereon executable instructions representing a configuration process for use with a node of a plurality of nodes of a lighting system, wherein said nodes communicate with each other using peer-to-peer multi-hop wireless networking, and each node includes:

a wireless transmitter for transmitting wireless signals to other nodes of the lighting system;

a wireless receiver for receiving wireless signals from other nodes of the lighting system;

at least one light source;

at least one sensing component configured to sense at least one characteristic of a corresponding sensing region and to generate a corresponding output; and a controller, the controller being configurable:
  (a) to control the light source based on one or more of:
    (i) the output of the sensing component;
    (ii) wireless signals received from one or more others of said nodes; and
  (b) to transmit wireless signals for use by other ones of said nodes to control their light sources;

the process including:

transmitting, from a user device, a request for configuration data representing a configuration of a selected node of said nodes, the request being transmitted from a wireless transmitter of the user device, wherein responsive to receipt of said request, the selected node transmits the requested configuration data to the user device via the wireless transmitter of the selected node;

receiving, at the user device, the configuration data from the selected node; and processing the received configuration data to generate display data representing the configuration of the selected node for display to a user of the user device.

Also described herein is a computer-readable storage medium having stored thereon executable instructions representing a process for execution by each of a plurality of nodes of a lighting system, wherein said nodes communicate with each other using peer-to-peer multi-hop wireless networking, and each node includes:

a wireless transmitter for transmitting wireless signals to other nodes of the lighting system;

a wireless receiver for receiving wireless signals from other nodes of the lighting system;

at least one light source;

at least one sensing component configured to sense at least one characteristic of a corresponding sensing region and to generate a corresponding output; and a controller, the controller being configurable:
  (a) to control the light source based on one or more of:
    (i) the output of the sensing component; and
    (ii) wireless signals received from one or more others of said nodes; and
  (b) to transmit wireless signals for use by other ones of said nodes to control their light sources;

the process being executed by the controller of the node, and including:

receiving, from one or more others of said nodes, occupancy data representative of occupancy of respective sensing regions of the one or more others of said nodes and of respective separations between said node and said sensing regions; and determining a dwell time for determining when to dim Or turn off the light source of the node in the absence of occupancy of the sensing region of the node, the dwell time being determined on the basis of the separations between said node and said sensing regions.

Also described herein is a computer-readable storage medium having stored thereon executable instructions representing a process for execution by each of a plurality of nodes of a lighting system, wherein said nodes communicate with each other using peer-to-peer multi-hop wireless networking, and each node includes:
- a wireless transmitter for transmitting wireless signals to other nodes of the lighting system;
- a wireless receiver for receiving wireless signals from other nodes of the lighting system;
- at least one light source;
- at least one sensing component configured to sense at least one characteristic of a corresponding sensing region and to generate a corresponding output; and
- a controller, the controller being configurable:
  - (vi) to control the light source based on one or more of:
    - a. the output of the sensing component; and
    - b. wireless signals received from one or more others of said nodes; and
  - (vii) to transmit wireless signals for use by other ones of said nodes to control their light sources;
- the process being executed by the controller of the node, and including:
  - receiving, via the wireless receiver of said node, a request to test wireless communications between said node and one or more other nodes of said plurality of nodes;
  - controlling the light source to provide a visual indication that the request was received by said node; and
  - transmitting, via the wireless transmitter of said node, a corresponding request to test wireless communications for receipt by one or more others of said plurality of nodes;
  - wherein said nodes include a first node that initiates the process in response to receipt of wireless signals from a user device such that said request is propagated from said first node to other second nodes of said plurality of nodes, the visual indications provided by second nodes receiving the request providing confirmation of wireless communications therebetween, and the absence of visual indications in one or more third nodes of said plurality of nodes providing an indication of the absence of wireless communication between the second nodes and the third nodes.

Also described herein is a computer-readable storage medium having stored thereon executable instructions representing a process for execution by each of a plurality of nodes of a lighting system, wherein said nodes communicate with each other using peer-to-peer multi-hop wireless networking, and each node includes:
- a wireless transmitter for transmitting wireless signals to other nodes of the lighting system;
- a wireless receiver for receiving wireless signals from other nodes of the lighting system;
- at least one light source;
- at least one sensing component configured to sense at least one characteristic of a corresponding sensing region and to generate a corresponding output; and
- a controller, the controller being configurable:
  - (a) to control the light source based on one or more of:
    - a. the output of the sensing component; and
    - b. wireless signals received from one or more others of said nodes; and
  - (b) to transmit wireless signals for use by other ones of said nodes to control their light sources;
- the process being executed by the controller of the node, and including:
  - transmitting, via the wireless transmitter, messages to one or more others of said nodes, each transmitted message including zone data identifying the node as being a member of at least one corresponding zone of a plurality of zones;
  - receiving, via the wireless receiver, messages from one or more others of said nodes, each received message including zone data identifying a corresponding one of said plurality of zones; and
  - determining how to process each received message based on one or more rules defining how a received message is to be processed based on the zone associated with the message.

BRIEF DESCRIPTION OF THE DRAWINGS

Some embodiments of the present invention are hereinafter described, by way of example only, with reference to the accompanying drawings, wherein.

DETAILED DESCRIPTION

Figure 1:
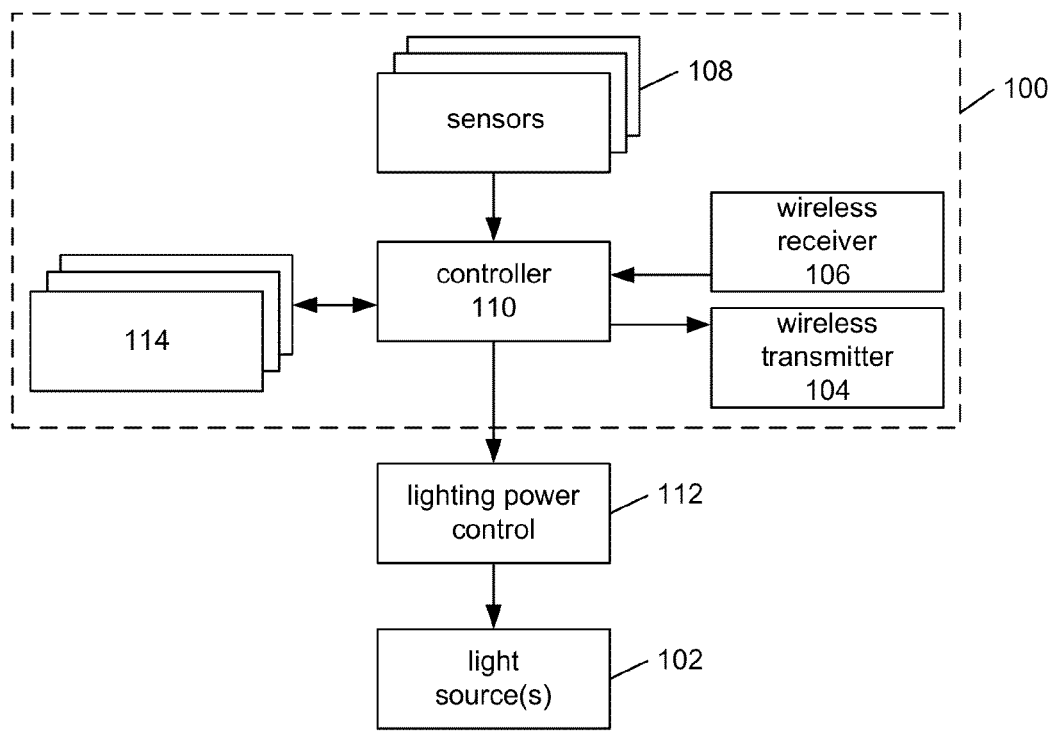
FIG. 1 is a block diagram of a lighting control apparatus or sensor node in accordance with the described embodiments of the present invention.

International Patent Application No. PCT/AU2011/000459, entitled *Illumination Apparatus Methods and Systems* ("the Sensor Node Patent Application"), the entirety of which is hereby expressly incorporated herein by reference, describes a lighting system and architecture in which a plurality of lighting control apparatuses or "sensor nodes" communicate with each other using peer-to-peer multi-hop wireless networking to form an ad hoc wireless network. As shown in FIG. 1, each sensor node 100 (which is typically but not necessarily situated adjacent to its controlled light source 102) includes a wireless transmitter 104 for transmitting wireless signals to other sensor nodes, a wireless receiver 106 for receiving wireless signals from other sensor nodes, and at least one sensing component or sensor 108 configured to detect or sense at least one parameter of interest (e.g., presence of an occupant and/or ambient light level) and to generate a corresponding output, and a programmable intelligent controller 110 for controlling the at least one light source 102 associated with the sensor node 100 by way of a lighting power controller 112. Optionally, the sensor node 100 may also include one or more additional components 114, such as a WiFi transceiver module or a global positioning system module, for example.

The controller 110 of each sensor node is configured to control its associated light source(s) 102 based on: (i) the output of each sensing component 108, or (ii) wireless signals received from one or more other sensor nodes by the receiver 106, or (iii) data stored in memory within or associated with the controller 110, or (iv) any combination of (i), (ii) and (iii). The controller 110 is also configured to cause the transmitter 104 to transmit wireless signals for use by other sensor nodes to control their own light sources.

A group of these sensor nodes 100 (and their associated lighting power controllers 110 and light sources 102) in mutual peer-to-peer communication constitutes an intelligent, configurable lighting system that provides many advantages over prior art lighting systems, some of these advantages being described in the Sensor Node Patent Application.

Figure 2:
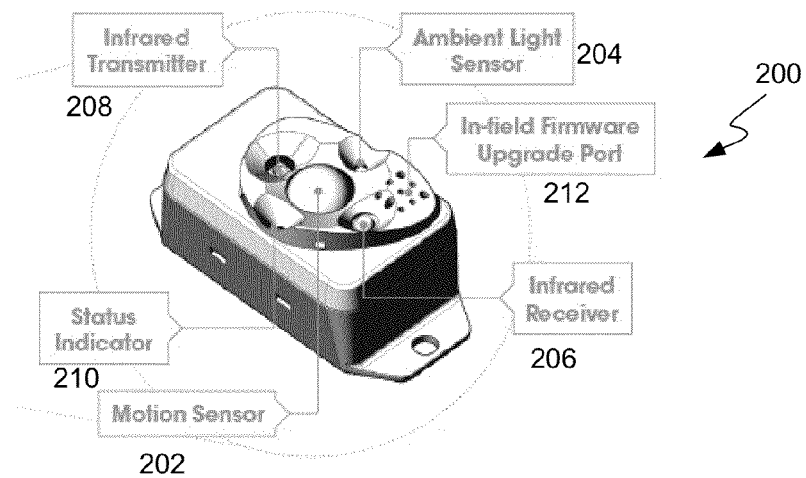
FIG. 2 is a perspective illustration of a lighting control apparatus or sensor node in accordance with some embodiments of the present invention.

A perspective view of one embodiment of a lighting control apparatus or sensor node 200 is shown in FIG. 2. In this embodiment, the lighting control apparatus 200 includes sensing components in the form of a motion sensor 202 and an ambient light Sensor 204, and the wireless receiver and transmitter are provided in the form of an infrared (IR) receiver 206 and an infrared transmitter 208. The lighting control apparatus 200 also includes a status indicator 210 and an in-field firmware upgrade port 212 for direct connection by a corresponding programmer, allowing the firmware of the controller (not visible in FIG. 2) to be installed or replaced. However, as described below, this can also be done via wireless means.

Figure 3:
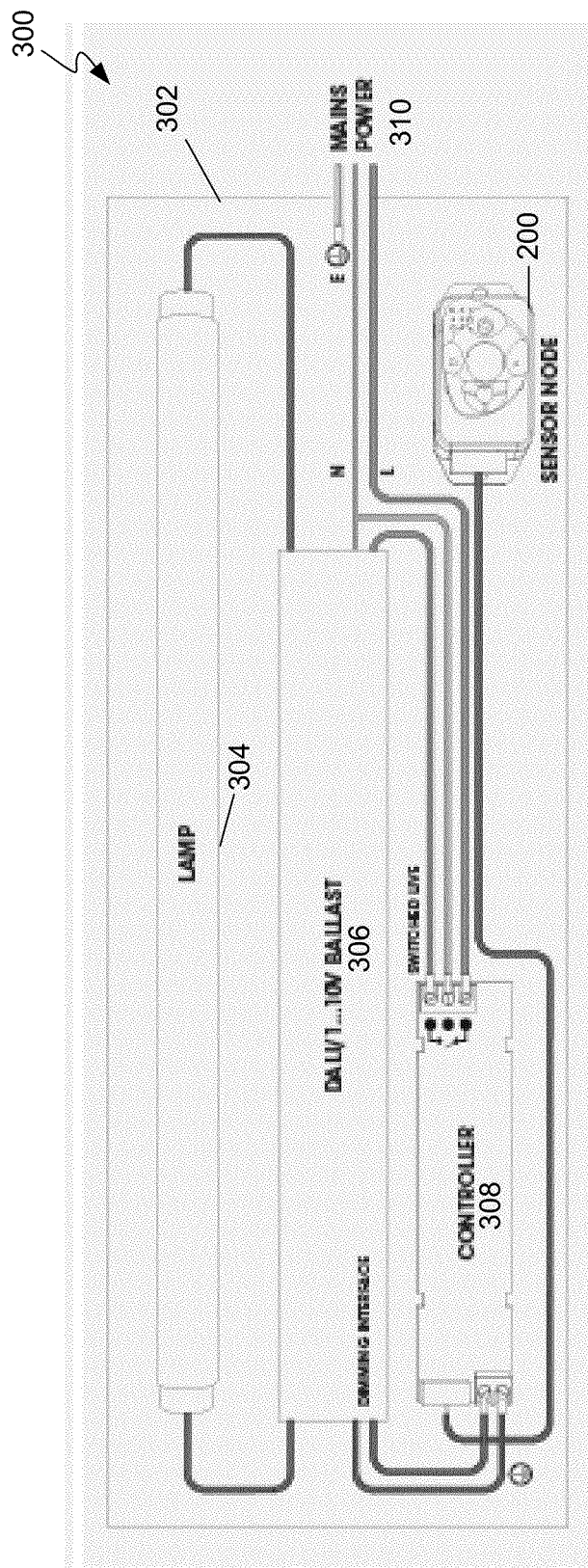
FIG. 3 is a schematic plan view of an intelligent luminaire or lighting node including the lighting control apparatus of FIG. 2, a light source in the form of a fluorescent lamp and associated ballast, and a lighting power controller.

FIG. 3 is a schematic diagram showing how the sensor node 200 of FIG. 2 can be installed into a housing 302 with a fluorescent lamp 304 and associated ballast 306 and lighting power controller 308 in order to provide an integral, intelligent luminaire or lighting node 300 that requires only mounting and connection of mains power 310 for installation.

Figure 4:
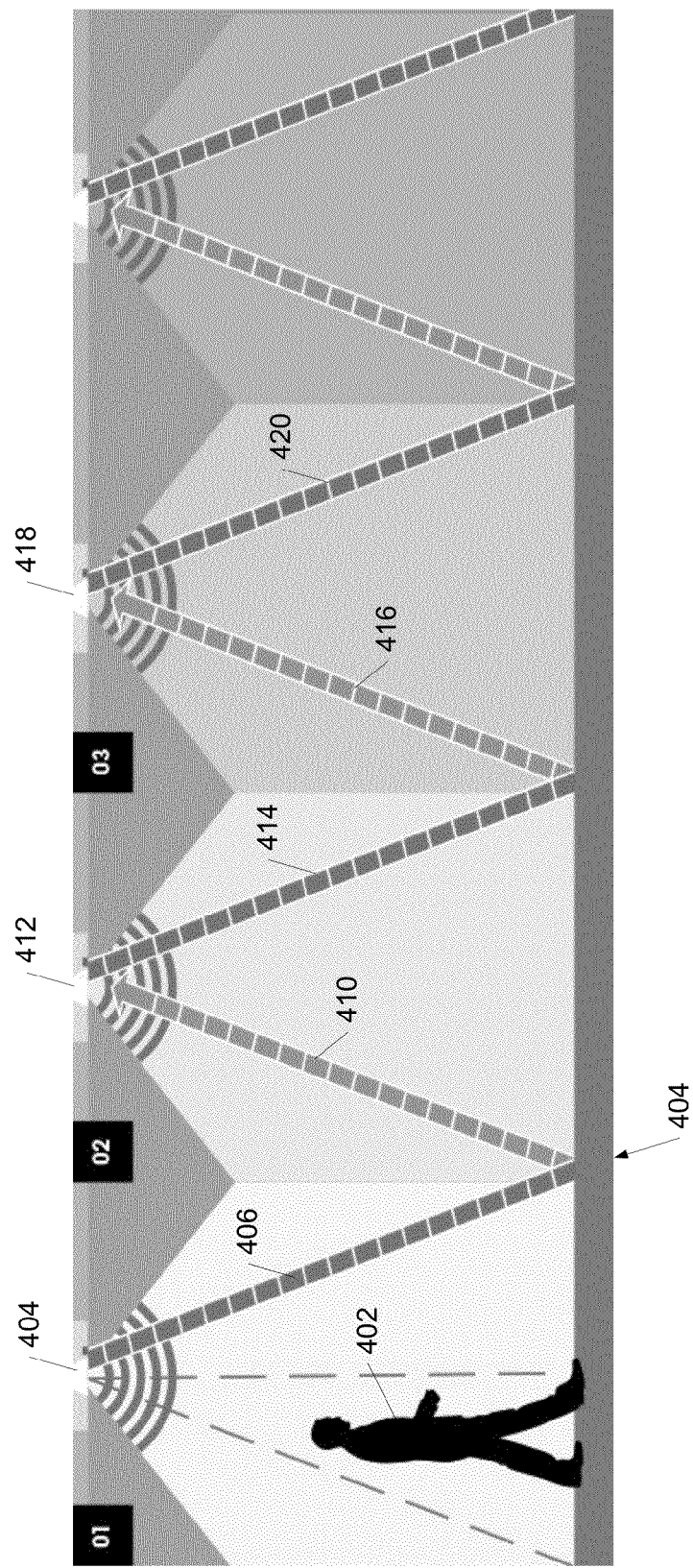
FIG. 4 is a schematic side view illustrating the typical operation of a lighting system consisting of an array of lighting nodes such as the luminaire of FIG. 3.

FIG. 4 is a schematic side view of an illuminated space illustrating one mode of operation of a lighting system consisting of an array of intelligent lighting nodes such as the intelligent luminaires 300 shown in FIG. 3. A person 402 walking under the motion sensor of a first sensor node 404 causes that motion sensor to output a signal representing the detection of motion in the motion sensor's field of view or sensing region. The controller of that node receives the signal and controls its associated light source to a configurable power setting (e.g., 100%) by outputting a corresponding control signal to the lighting power controller associated with the node. In addition, the controller causes the node's transmitter to output wireless signals representing the detection of motion by its motion sensor. For reasons that will become clear in the following description, these signals are referred to herein as "level 1" signals.

In the described embodiment, the transmitter is an infrared (IR) optical transmitter and is configured so that the transmitted IR signals are directed downwards in the form of a diverging cone 406 that is reflected from the floor 408 and/or any furnishings illuminated by the IR signals 406 to provide reflected IR signals 410 that can be received by other sensor nodes within range of the reflected IR signals 410.

In this example, the reflected level 1 IR signals 410 are received by the receiver of a second lighting node 406, indicating to the second node 406 that one of its immediate neighbour nodes (i.e., one hop away) has detected motion. Accordingly, the second node 406 controls its own light source to a corresponding illumination intensity (e.g., 80%) and transmits its own IR signals 414 representing the information that a node spaced two hops away from any receiving nodes has detected motion. Accordingly, these IR signals 414 are referred to herein as "level 2" signals.

This process continues, so that the IR signals 414 are again reflected from the floor 408 to provide reflected IR signals 416 that are received by a third sensor node 418. The third sensor node 418 is thus informed that motion has been detected at a location spaced two nodes away from it, and in response it controls its own light source to a corresponding illumination intensity (e.g., 60%), and transmits corresponding "level 3" IR signals 420 indicating to any further receiving sensor nodes that motion has been detected at a location three node spacings away. This process continues until the spatial separation of a receiving node from the node detecting motion reaches a configurable threshold separation (e.g., 5 hops), at which point that node does not transmit any further IR signals.

Figure 5:
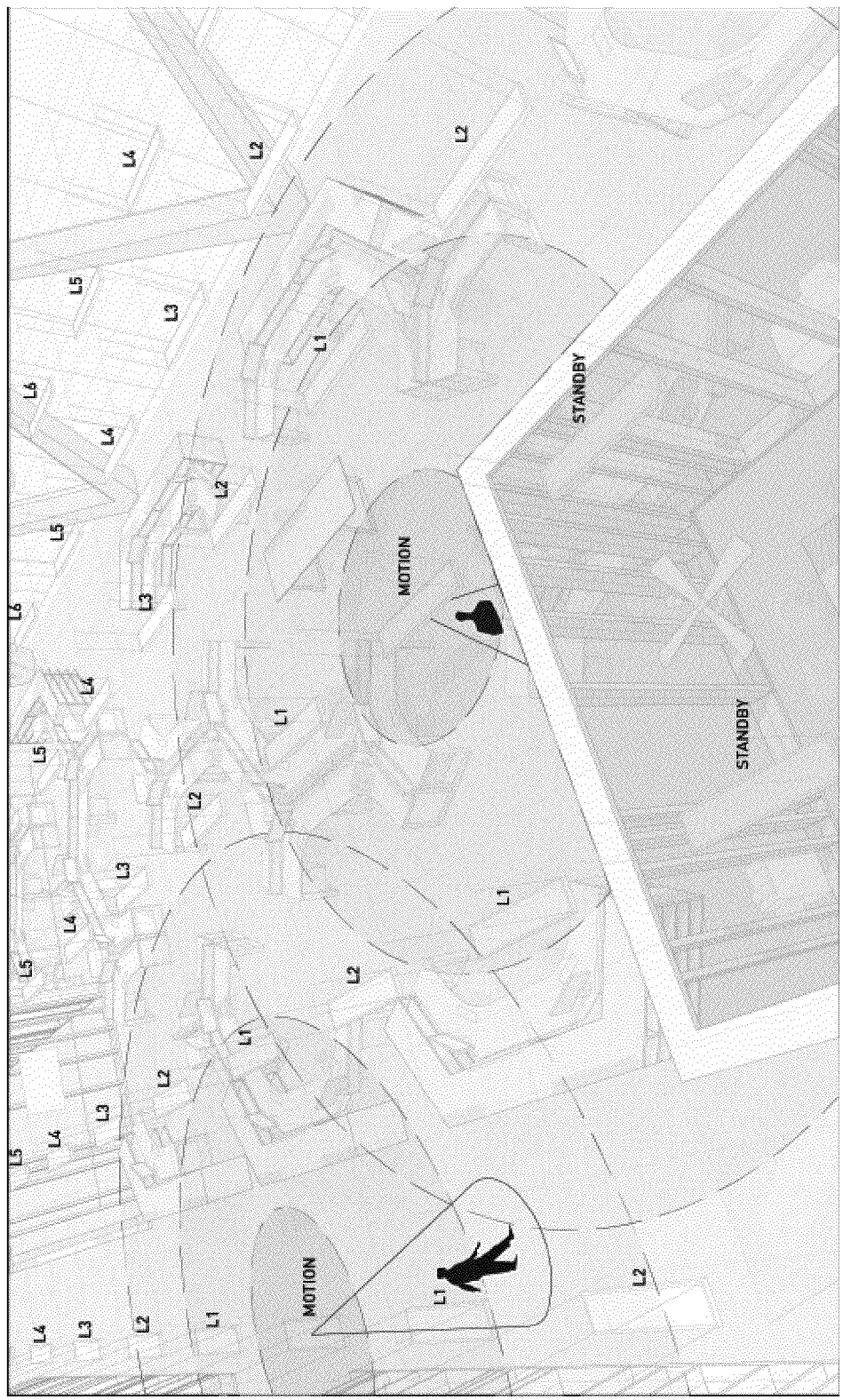
FIG. 5 is a perspective illustration showing zones of respective different illumination intensities surrounding occupants in an office environment.

Although the schematic representation shown in FIG. 4 is only one dimensional, it will be appreciated that in reality the transmission of wireless signals from node to node, and consequently the control of the corresponding light sources, occurs in two dimensions, as shown in FIG. 5. Considering the dependence on spatial separation in terms of the spatial separation (or number of hops) between neighbouring sensor nodes, the wireless signals representing motion detection at different spatial separations (corresponding to the 'level' or hop count represented by the signals) define respective motion zones of respective illumination intensities. Thus in FIG. 5, human movement causes the illumination of concentric, generally annular regions of respective illumination intensities (represented as "L5", "L4", "L3", and "L2" in FIG. 5) disposed about a central circular zone of (typically) maximum illumination intensity ("L1").

The sensor nodes (hereinafter also referred to simply as "nodes" for the sake of brevity) of the lighting system can be regarded as a platform, since the nodes can be programmed or re-programmed as desired, either as part of the manufacturing process, during installation, or in the field, or indeed at any time after installation. This ability to reconfigure the nodes as desired allows the system as a whole to provide enhanced functionality and to support configurations and applications as the need arises. In particular, the sensor nodes can be programmed not only to modify the processes or algorithms that each node uses to control its own light source(s), but also how the nodes exchange data with one another and what data is exchanged, whether related to lighting or otherwise.

Group Configuration

Although the centralised nature of prior art addressable lighting systems in theory facilitates their configuration, in practice this process is complex and time-consuming, with control engineers spending time mapping virtual components to their real counterparts, and ensuring that the various systems and components are correctly communicating with one another. This can obfuscate the step of directly programming the operation of individual lights or lighting zones to optimise lighting and energy usage while also providing occupant satisfaction.

In contrast, the distributed intelligence system described herein and in the Sensor Node Patent Application requires no configuration in that it can operate satisfactorily 'out of the box': i.e., without requiring any specific configuration to the installation.

Distributed Intelligence Architecture

A substantial benefit of the distributed intelligence architecture of the lighting system is its robustness. Since each sensor node is self sufficient, consistency of communication is not a critical requirement to avoid catastrophic failure. Each node is configured to control its associated light source(s) based on the information available to the node. More information generally leads to better control, although limited information still allows acceptable system performance. Furthermore, due to the removal of central control, there is no requirement to create a virtual mapping of the light and sensor system.

Behaviour Configuration and Moods

The distributed architecture of the peer-to-peer lighting system allows decisions to be made locally by a sensor node co-located with each light source. There are a number of parameters that can be used by each node to determine the response of its light source to a given set of environmental conditions. These parameters include light output and dwell time, low lux output and low lux dwell time. The response of a node to a given lighting configuration can differ, depending on the circumstance of that node, for example, whether it is located in an open office, or a car park or a mine shaft. The nodes can be pre-configured during manufacture with a set of lighting moods that provide behaviour suitable for standard installation situations. Users can subsequently adjust the relevant parameters based on their preferences, as described below.

Figure 6:
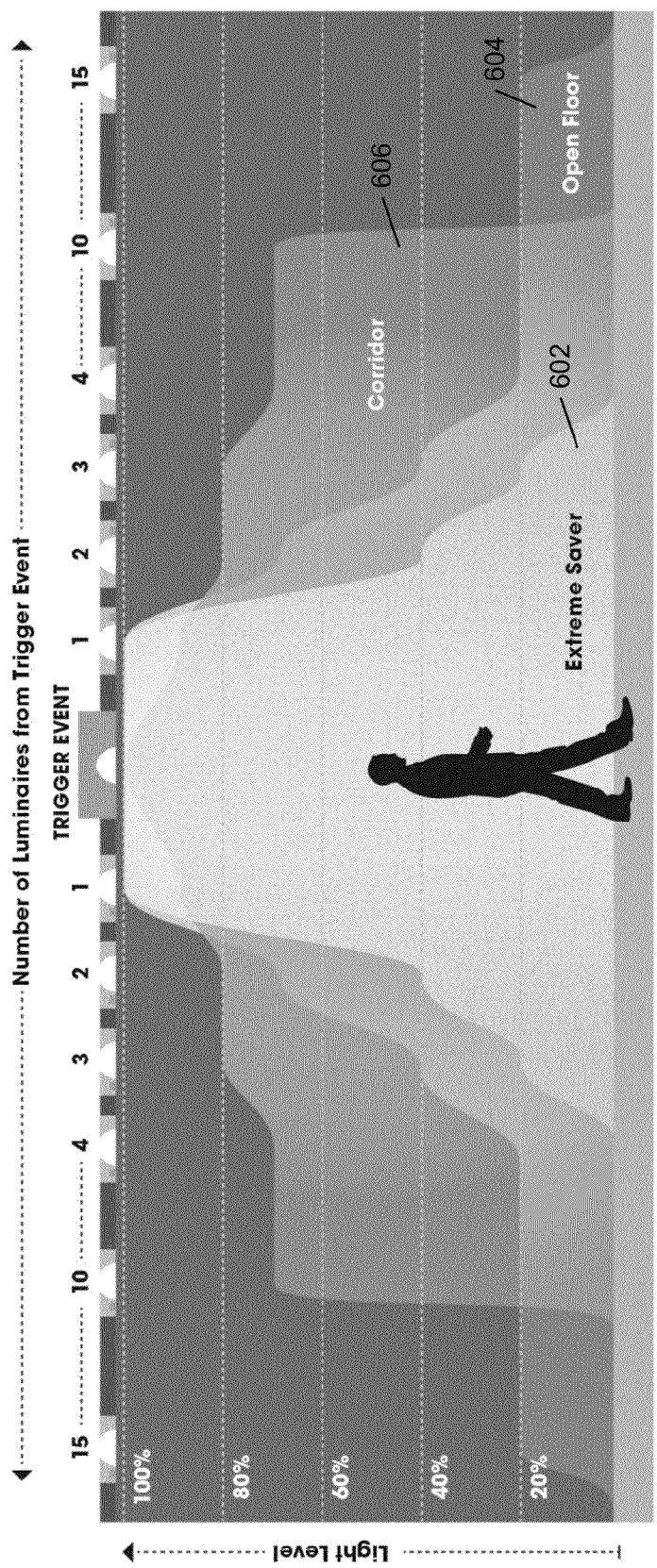
FIG. 6 is a schematic illustration of the use of different lighting configurations or moods that result in different lighting envelopes surrounding each occupant.

For example, FIG. 6 is a schematic diagram illustrating one possible set of different lighting configurations or "moods" that can be programmed into the controllers of sensor nodes in order to determine the illumination intensity envelope that will result from the detection of motion at different separations from each node. For example, an "extreme saver" lighting configuration 602 can be defined to provide 100% illumination intensity at locations at or within one sensor node separation or spacing from the detected motion, falling to 40% illumination intensity at two separations, 20% at 3 separations, and 0% at greater separations. Thus this lighting configuration results in strong illumination immediately surrounding each occupant, but very little illumination at greater distances. Clearly, this lighting configuration envelope 602 will result in lower consumption of energy at the expense of comfort for the occupants.

In contrast, an "open floor" lighting configuration 604 provides the same illumination intensity at locations within one node separation of the occupant, but increases the illumination intensity from 40% to 70% at locations between 1 and 2 node separations, from 20% to 40% between 2 and 3 node separations, and extends the outer illumination boundary from 3 node separations to 15 node separations, thus providing a very large illumination zone of low intensity.

Finally, a 3$^{rd}$ "corridor" illumination configuration envelope 606 provides a maximum illumination to a maximum separation of 10 nodes from each occupant, but at a relatively high illumination intensity of 70%.

Sensors and Microprocessor Dedicated to Each Light Allows Ultimate Optimisation

In the prior art, high end centralised control systems allow for control of individual lights, often referred to as individual addressability. In such systems, when controlling a chosen individually addressable light source, a central computer receives information from a distributed set of sensors, and processes the received sensor information together with a virtual mapping to make calculations based on the sensed information and how that information relates to the environmental conditions under the chosen light source, and from those calculations determine appropriate instructions or control data that can be used to control the light source in order to achieve the desired lighting outcome.

The peer-to-peer lighting system described herein provides substantial improvements in performance and simplification by dedicating a set of sensors and a controller to each light source, and by making decisions locally. By having the controller co-located with the light source (and typically, but not necessarily, both being disposed within a common housing (e.g., in the form of a luminaire as shown in FIG. 3)), the requirement for a virtual mapping or separate communication system (either wired or wireless) for carrying control instructions is removed. By having sensors dedicated to each light source, the requirement for a virtual mapping is again avoided, and the need to conduct analysis or make approximations about the conditions under a given light source based on information under remotely located sensors is removed.

Task Lighting & Lumen Maintenance

The system also allows for accurate lumen maintenance at every given location, suitable for the task conducted at each location. For example, if a lighting node is located above a pot plant, it can be set to a much lower illumination intensity than if it was illuminating a watchmaker's workbench. Importantly, the system will also know when the watchmaker is at his workbench, and so can be configured to only illuminate to the desired level when the occupant is present. This is commonly referred to as task lighting.

A further enhancement is the ability of the described system to provide a lumen maintenance function to offset factors that may impact a light source's illumination efficacy; for example, light output deterioration in fluorescent lamps or temperature effects on light emitting diodes (LEDs). In embodiments where each sensor node includes a dedicated ambient light sensor, the node's light source can be controlled to deliver a certain luminance which automatically drives a light source harder when its efficiency drops.

Single Node Configuration Process-Hand Held Device

The system described herein allows the control of individual light sources (i.e., nodes) to be reconfigured independently of other light sources (nodes), either by the occupant or another party. A significant benefit of independent node configuration is that it can be done using a simple handheld device (e.g., a smartphone, infrared remote control, or the like) while standing directly under the node (in situ). This facilitates a higher level of access to control lighting parameters by users, since configuration is not conducted at a remote (and typically locked) location, or via a virtual representation that requires interpretation skills, as is the case of a centralised system. It also allows the party performing the configuration to have an appreciation of the specific environment that is being illuminated by that light source (node), and to get direct feedback of the effect of the lighting adjustment both through their own senses, and/or optionally also using measurement technology, for example, a hand held light meter.

The system also allows individual occupants to control their own lights, which in the context of an indoor environment has been demonstrated to widen the occupants' environmental comfort bands, which in turn permits reduced energy consumption. Some of the variables an individual might want to adjust include the light output or illumination of the lighting node while the space is occupied, and the dwell time of the node's sensor (typically, a motion sensor or other sensor whose output can be used to detect or infer human presence) before it switches the light source off.

Group Configuration Process

The ability to configure lighting nodes in situ is a significant advantage of the lighting system. However there are scenarios where it is preferable to have an entire array of lights set to the same setting, either permanently, or as a starting point to assist individual configuration. For example, office grids are often quite uniform, and can be designed to provide quite high illumination (lux) levels. If the percentage light output required to meet a relevant lighting code is determined in one location, it is typically similar for all the light fittings in the same installation. In another example, a particular facilities manager might be aggressive with energy savings and wants a very short motion sensor dwell time, at the risk of some of the lights switching off occasionally when occupants are present. In such scenarios, it is desirable to have a more centralised method of bulk configuration.

In some embodiments, the re-configurability of many nodes is facilitated by a group configuration process executed by each node of a group or set of nodes, in which configuration data received by one node (for example, from a handheld user device) is then relayed to other nodes of the group to propagate the configuration to those other nodes.

Figure 7:
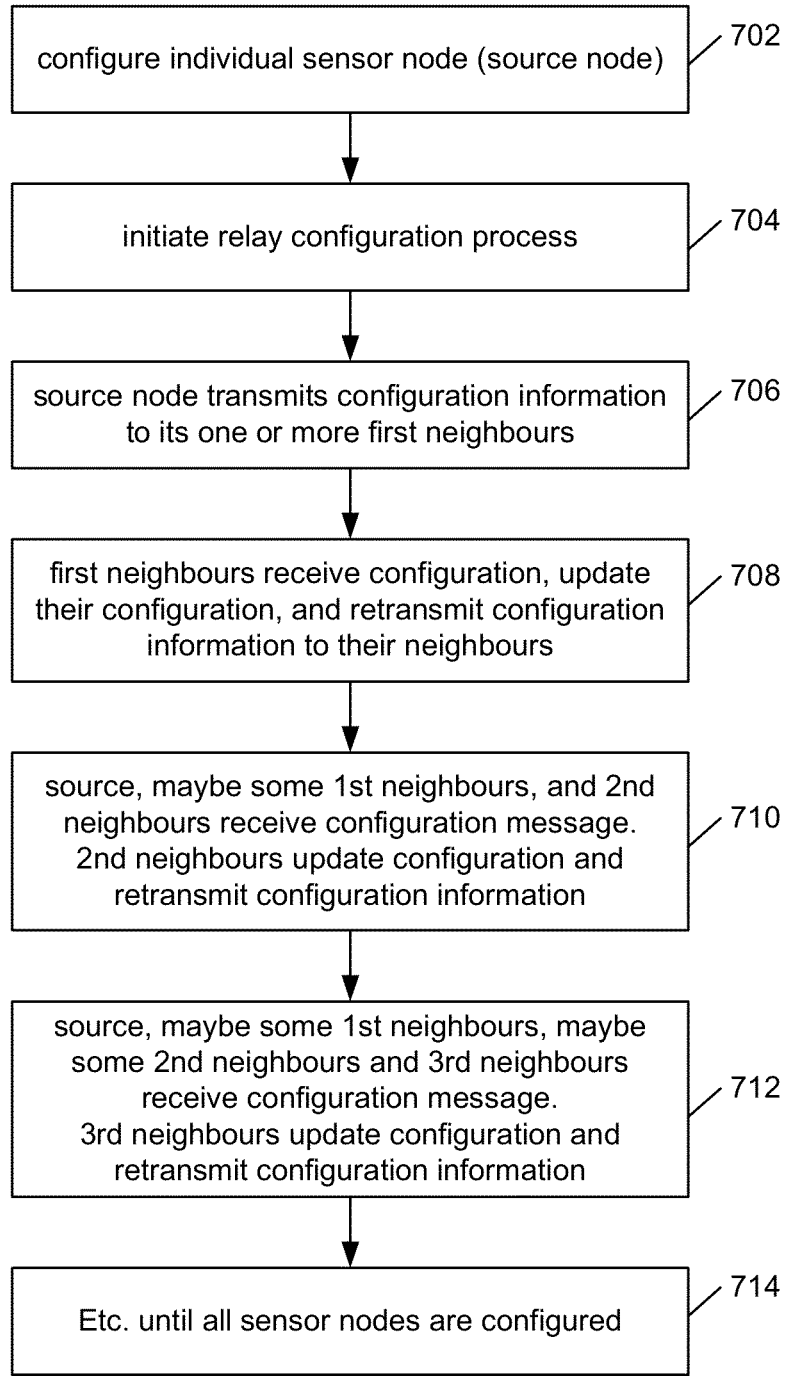
FIG. 7 is a flow diagram of a group configuration process in accordance with some embodiments of the present invention.

An example scenario is shown in the flow diagram of FIG. 7. At step 702, a user configures an individual node, using a hand held device such as a smartphone, for example. When the user is satisfied with the node configuration and wishes other lights in the same room or zone (see below) to have the same or a corresponding configuration, at step 704 the user instructs the node to execute the group configuration process.

In response to receipt of a command to execute the group configuration process, at step 706 the node retrieves or generates configuration data representing its own configuration, as set by the user, and then forwards or otherwise transmits the configuration data from its wireless transmitter.

At step 708, each other node within range of the wireless signals generated by the initial node receives the transmitted configuration data, updates its own configuration in accordance with the received configuration data, and the re-transmits the configuration data from its own wireless transmitter. In this manner, the configuration data and the node configuration propagate from the initial node to other nodes in a peer-to-peer manner at steps 710, 712 until all of the nodes are configured in accordance with the configuration data at step 714.

It will be apparent from the above that each node will receive the configuration data more than once. In particular, any given node will generally receive the configuration data back from each node that received the configuration data from that given node. The potential problem of almost simultaneous, overlapping transmissions by multiple nodes, leading to signal interference between nodes can be almost entirely avoided by each node waiting a random delay period before relaying a message. By relaying the message more than once (with another random delay before the second and each subsequent transmission), any occasional interference can be overcome or alleviated. Many other possible arrangements for avoiding collisions will be apparent to those skilled in the art, including methods based on standard collision avoidance methods and protocols known to those skilled in the art.

To prevent the group configuration process from infinitely looping, in some embodiments the transmitted configuration data includes an index or hop count that is incremented by each receiving node prior to re-sending and is used to limit the number of hops. In other embodiments, each node starts a timer following its reconfiguration and ignores any configuration data or configuration commands that are identical in content to those already relayed, and that are received before the corresponding timer expires. In some embodiments, the original node generates a random number that is included with the configuration data, and each node then stores the random number for a predetermined period (e.g., 1 hour) and compares the stored number with the random number included in any subsequently received configuration data so that the node ignores configuration data that it has already used.

Configuration Interrogation

In general, it is not necessary to know or document how each node has been configured. However, if it is desired to determine how a node has been configured, the user is able to interrogate one or more nodes by sending each such node a configuration query command. This can be done, for example, by the user standing under a selected node and using a hand-held device such as a smart phone or IR controller to communicate with the wireless receiver of the node.

Figure 8:
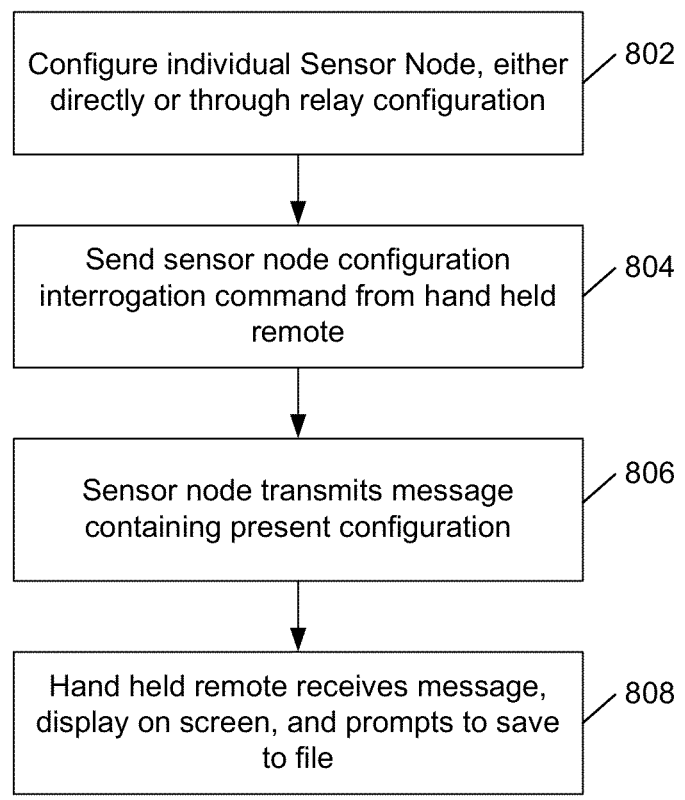
FIG. 8 is a flow diagram of a configuration request process in accordance with some embodiments of the present invention.

For example, FIG. 8 is a flow diagram of a configuration query process. After configuring a sensor node at step 802, using either the single node configuration process or group configuration process described above, at step 804 a user transmits a configuration query request from a hand-held IR controller. At step 806, the node receives the configuration request and in response transmits configuration information representing its current configuration to the user device. At step 808, the user device then receives the configuration data and displays the node's configuration to the user. If desired, the user can save the configuration information to storage of or otherwise associated with the user device.

Adaptive Motion Dwell Time

A significant drawback of many motion sensor controlled lights is the sensitivity of the motion sensor, which is often inadequate to sense occupants without some minimum level of movement, resulting in lights switching off or dimming at inappropriate times when occupants are present. One method to reduce the impact of this issue is to use a dwell time that is used to keep the lights on for a fixed period of time after occupants are no longer sensed, and is reset each time the motion sensor senses occupants. However, choosing a value for the dwell time is a balancing act between occupancy comfort and energy efficiency: too long a dwell time and a lot of energy is wasted illuminating an empty space; conversely, too short a dwell time risks disrupting the occupants by forcing them to consciously move solely to activate the motion sensors.

The lighting system described herein overcomes this problem to a large degree due to the following inherent redundancies within the system:

1. There is an array of sensors (which may or may not be motion sensors) that generate outputs representative of human occupancy, each sensor serving the area that the corresponding node is illuminating, as opposed to traditional systems that have one wide angle sensor serving a zone of several luminaires. This means that there are no blind spots; for example, pillars or partitions do not block the view of the motion sensor. In prior art lighting systems, this often happens, forcing the occupants to actually get up and walk to an area where the motion sensor can detect the occupants.

2. There is overlap between the sensors, which results in several motion sensors being able to see a given occupant. This means that micro-movements that might be invisible to a motion sensor at a particular angle can activate a different motion sensor that has a different angle of view.

3. Any given light can be activated not just by its own dedicated (e.g., motion) sensor, but by occupancy information transmitted to it from neighbouring sensor nodes. So if one person does not move, but there are other occupants in the vicinity activating the sensors of corresponding lighting nodes, the light above the non-moving occupant can be kept on.

4. The ability to easily configure each light individually allows different sensor nodes to have different dwell times, so if there is one occupant that is particularly prone to having their light switch off, then the dwell time of that node can easily be extended without extending the dwell time of other nodes in the system. This results in improved lighting conditions without significant increases in energy consumption.

The above features are inherent in the distributed intelligence peer-to-peer lighting system described herein. However, it will be apparent that point 3 above does not apply if an occupant is alone in the office. The lighting node above the occupant will, however, be aware that that no one else is close (due to the absence of received messages from other nodes—or at least from nodes that are far away) and is therefore able to change its behaviour accordingly. In some embodiments, each node selects its dwell time based on whether occupancy information or not has been received from distant nodes. The particular dwell times and the node separation threshold (i.e., being or corresponding to the number of nodes between the receiving node and originating nodes detecting human presence) are user configurable parameters. Thus the system can be said to use adaptive presence dwell times.

Transmit Test Range & Calibration

In some embodiments, the lighting system described herein depends on wireless peer-to-peer communications that are sensitive to the environment. Consequently, in some environments the communications cannot be guaranteed on specification alone, and transmit range testing may be required, the objective being to ascertain how reliably the nodes communicate with each other.

Figure 9:
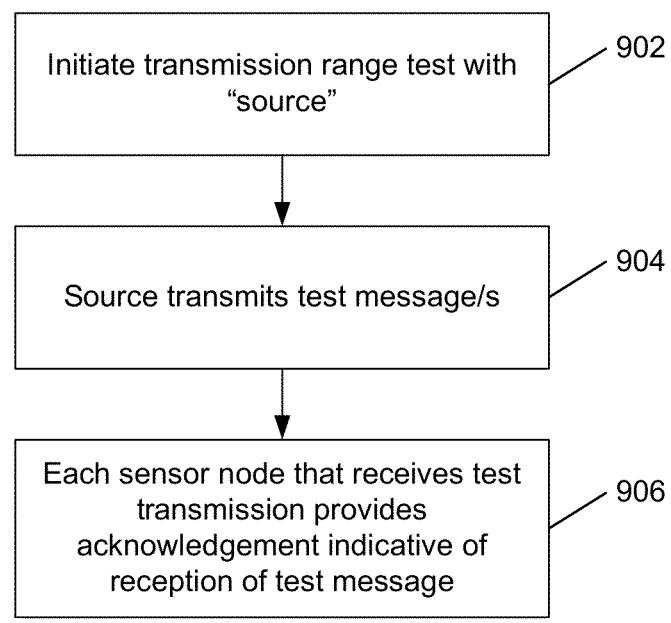
FIG. 9 is a flow diagram of a transmit range test process in accordance with some embodiments of the present invention.

In order to address this potential issue, in some embodiments the nodes are configured to execute a range test process on demand, as shown in FIG. 9. For example, at step 902 a user may issue a range test request or command to a node by standing under that node and issuing the command from a hand-held communications device, which may be in the form of a dedicated control device with wireless (e.g., infrared (IR), Wi-Fi, Zigbee, Bluetooth, or the like) transceiver, or a general purpose device such as a portable or tablet computer or smartphone.

The node receives the range test request, and controls its light source(s) to provide a visual indication that the request was successfully received by that node (e.g., by causing the light source to flash or blink on and off three times). After a configurable but typically short delay (e.g., 1 second), at step 904 the node then transmits, via its wireless transmitter, a corresponding test request for receipt by one or more other nodes within wireless range of the transmitting node. Like the first node, at step 906 each node receiving the signal controls its light source(s) to provide a visual indication that the request was successfully received by that node. The requests thus propagate or hop from node to node, enabling the user to visualise the communications (or absence thereof) by way of the visual indications generated by the nodes that successfully received test requests.

In some embodiments, the visual indications are representative of the number of hops from the originating node that the request had undergone before reaching the node (e.g., the number of flashes is equal to the number of hops). Additionally, as with the configuration process described above, the nodes can ignore subsequent tests requests in a manner described above; for example by using timers or a random number included with the test requests. Other variations and options will be apparent to those skilled in the art in light of this disclosure.

Point to Point Communication Optimisation

It is generally desirable that each node directly communicates with its immediate neighbour nodes, but not with more distant nodes (i.e., where there is at least one intermediate and closer node). To test communication performance, each sensor node can execute a point-to-point test (P2PT) process. This can be self-executed, or initiated by a user. The purpose of the test process is to optimise or improve the reliability of communication between neighbouring sensor nodes. The test involves a node transmitting wireless signals representing a set of test messages and then receiving corresponding wireless signals transmitted by other nodes in response to receipt of the transmitted test messages. During the test, one or more wireless signal transmission parameters are changed, one of which may be signal strength. Following the test, an analysis is performed on the received response signals, and the node's controller then determines the preferred signal transmission parameters to optimise communication with other nodes. To assist other sensor nodes conducting P2PT configuration, a node may be configured to respond with a P2PT response message including data representing its own wireless transmission parameters. The nodes can be configured to propagate test messages to other nodes only up to certain number of hops.

In one embodiment, a sensor node is put into test mode (Test Node) to optimise communication with other nodes. The Test Node tests at least one wireless communications parameter across a corresponding predetermined range. For example, the parameter might be wireless signal transmission strength and might vary between 1 A and 2 A. Ten test messages are sent out at 1 A, and the controller records how many different nodes (Neighbour Nodes) return P2PT response messages, and the reliability of the response received from each of them. Collisions of these responses can be reduced by using any of the methods described above.

An equivalent set of test messages is then sent out at the higher transmission strength of 1.1 A, and this is then repeated through the tested range of transmission powers. Following the test, the results are then analysed by the Test Node to assess, for each signal strength, which Neighbour Nodes are direct (i.e., single hop) neighbours, and which are two or more hops away. The Test Node then selects a preferred configuration for the parameter, in this example being wireless signal transmission strength.

To assist other sensor nodes in conducting P2PTs, various configurations may be used to ensure that the P2PT response messages are most useful. For example, the nodes can be configured so that the P2PT response messages are always sent with maximum signal transmission strength to ensure that they will be received by the originating (test) node. Additionally, the nodes can be configured so that they send a "level 2" P2PT response message if they receive a P2PT response message they didn't originate, regardless of how far the receiving node is from the originating test node, (as described in the Sensor Node Patent Application, a peer-to-peer relayed "level n" message (where n is an integer >0) is a message containing or representing the value n as the number of hops from the node that generated the message). A node may also measure the strength of the reflected signals originated from itself to optimise transmission.

Harmony of Communication Wavelength and Visible Light

A substantial advantage of the described peer-to-peer lighting system is the ability to adapt to environmental changes, such as moving partitions or office layouts. In some embodiments, a high degree of flexibility is gained where the wireless transmissions have similar properties to visible light. Since the function of a lighting system is to provide light to occupants, in a situation where an obstruction is introduced such that an occupant can no longer "see" a light source, so it makes sense that the light source no longer responds to the presence of the occupant.

Consequently, in embodiments where the wireless transmitters are infrared transmitters, the resulting correspondence between the optical lighting function of the system and the optical peer-to-peer communication means provides functional advantages over configurations that use non-optical communication means.

Zoning

The lighting system described herein is elegant in its fundamental simplicity, and yet allows great flexibility and, indeed, potential complexity in its processing. The Sensor Node Patent Application describes various ways that each lighting node can behave in a range of different lighting situations by using pre-programmed illumination outputs depending on how close the closest occupant is to the node.

However, there may be situations where it is desired to modify the response of nodes across different areas. For example, it might not be desirable for the light in a meeting room to come on in response to the signals received from a nearby node located in a corridor, or vice versa. One solution to this problem is to configure a sensor node as being a member of a specific "zone" or group identified by a corresponding zone (or group) identifier, include the zone identifier in its wireless transmissions, and define rules determining how the node treats wireless signals received from each other node, depending on the zone identifier of the other node. An installation of the lighting system can thus be broken down into zones or groups of lighting nodes, if desired.

It will be apparent from the above, that the use of zone identifiers and associated rules allows great flexibility in behaviour. Although perhaps the most common configuration is to define rules that tell a node to ignore signals from zones other than its own, it will also be apparent that more complex rules can be defined to provide additional functionality to the system. In another simple example, the nodes in two adjacent zones A and B are configured to allow processing of signals from Zone A to another zone (B), but not in the other direction.

Depending on the desired application, the zone identifier in each transmission may identify the zone associated with the (previous hop) transmitting node itself (including where that node is simply propagating or forwarding a message received from another node), or alternatively the zone identifier may identify the zone associated with only the originating node (which may be many hops away) that first generated the message that is then propagated from node to node.

Dynamic Motion Thresholds

In some embodiments of the lighting system, due to constraints of cost or size, it may be the case that the wireless transmitters have the potential to cause interference to the sensing components, potentially resulting in the incorrect identification of human presence or occupancy when no occupants are present. However, this can be avoided by altering the decision threshold used to determine whether the output of the sensing device is indicative of human presence. The threshold can be increased temporarily by an amount known to be as large as or greater than the magnitude of the interference that is caused by the wireless transmitter. Thus the sensor detection by a node is effectively desensitised during transmission of wireless signals by that node to suppress spurious detection caused by interference.

Motion Sensor Failure Detection

In a large lighting installation with many sensing components present in many nodes, it is possible that one of the sensors will over time develop a fault that results in it permanently providing an output indicative of the presence of humans, even when no humans are in fact present. This would have quite serious consequences for the energy consumption of the lighting installation, because the faulty sensor would not just switch on one light unnecessarily, but via peer-to-peer communication, the single faulty sensor would switch on many, or even all, of the lights, all of the time (depending on configuration). If the building is not occupied continuously all day and night, every day and night, then it is possible to address this potential problem by having each node monitor the output(s) of its sensing component to determine whether that output is permanently on (or otherwise indicative of human presence) for an entire 24 hour period (or some other long period). If so, then the node can infer that its sensing component is likely faulty. In this case of a sensing component that is probably faulty, the sensor can be disabled or ignored, so that it does not cause neighbouring nodes to be notified of human presence (incorrectly) detected by the faulty node. In addition to deactivating its sensor(s), the light source associated with the node can be turned on continuously to indicate that the node requires maintenance, or alternatively the light source can continue to switch on and off for short periods (i.e., flash or blink), based purely on the signals received from neighbouring nodes, meaning that the light source would be on only when neighbouring nodes detect occupancy.

Lamp Burn—In Function

Some light sources (for example certain fluorescent tubes) need to be operated for an initial part of their lives at maximum brightness, because they can be damaged by dimming during this initial period. Accordingly, each node includes a timer that can be reset using a remote control handset when the fluorescent tube is changed, and this timer is used to ensure that, for the initial period of operation of the fluorescent tube, the tube is either switched on or off, but is never dimmed. After the timer expires, the node permits dimming. This avoids the need for a human to keep track of the cumulative running time and revisit the node to reconfigure the node after the new fluorescent tube has completed its initial run-in period.

Many modifications will be apparent to those skilled in the art without departing from the scope of the present invention.

The invention claimed is:

1. A lighting control apparatus for controlling one or more light sources, the lighting control apparatus including:
   at least one sensor for detecting or sensing a parameter of interest;
   a transmitter for transmitting one or more wireless signals to one or more other lighting control apparatuses;
   a receiver for receiving one or more wireless signals from one or more other lighting control apparatuses; and
   a controller having at least one processor and a memory in communication with the processor to store configuration data representing one or more processes to be executed by the processor;
   wherein the stored configuration data represents one or more processes that, when executed by the processor, causes the processor to:
   receive, from one or more other lighting control apparatuses, occupancy data representative of occupancies of respective sensing regions of the one or more other lighting control apparatuses and respective separations between a sensing region of the lighting control apparatus and said sensing regions; and
   control the one or more light sources on the basis of the occupancies and respective separations.

2. The lighting control apparatus of claim 1, wherein the stored configuration data represents a process that, when executed by the processor, causes the processor to transmit, via the transmitter, configuration update data representing one or more processes to be executed by one or more other lighting control apparatuses.

3. The lighting control apparatus of claim 1, wherein the stored configuration data represents at least one process that, when executed by the processor, causes the processor to:
receive, via the receiver, a request for configuration information representing a configuration of the lighting control apparatus; and
responsive to receipt of said request, transmit the requested configuration information.

4. The lighting control apparatus of claim 1,
wherein the stored configuration data represents one or more processes that, when executed by the processor, causes the processor to:
determine a dwell time for determining when to dim or turn off the light sources in the absence of occupancy of the sensing region of the lighting control apparatus, the dwell time being determined on the basis of the separations between said sensing region of the lighting control apparatus and the sensing regions of the one or more other lighting control apparatuses.

5. The lighting control apparatus of claim 1,
wherein the stored configuration data represents one or more processes that, when executed by the processor, causes the processor to:
receive, via the receiver, a request to test wireless communications between said lighting control apparatus and one or more other lighting control apparatuses;
control the one or more light sources to provide a visual indication that the request was received by said lighting control apparatus; and
transmit, via the transmitter, a corresponding request to test wireless communications for receipt by one or more other lighting control apparatuses.

6. The lighting control apparatus of claim 1,
wherein the stored configuration data represents one or more processes that, when executed by the processor, causes the processor to:
(i) receive, via the receiver, a request to test wireless communications between said lighting control apparatus and one or more other lighting control apparatuses;
(ii) transmit, via the transmitter and at a corresponding selected wireless transmission power, a test message for receipt by one or more other lighting control apparatuses;
(iii) receive, via the receiver, response messages confirming receipt of the test message from one or more other lighting control apparatuses;
(iv) repeat steps (ii) and (iii) for respective different wireless transmission powers; and
(v) process the received response messages and data representing the corresponding wireless transmission powers to select a wireless transmission power for use in subsequent wireless transmissions by the transmitter.

7. The lighting control apparatus of claim 1,
wherein the stored configuration data represents one or more processes that, when executed by the processor, causes the processor to:
transmit, via the transmitter, messages to one or more other lighting control apparatuses, each transmitted message including zone data identifying the node as being a member of at least one corresponding zone of a plurality of zones;
receive, via the wireless receiver, messages from one or more other lighting control apparatuses, each received message including zone data identifying a corresponding one of said plurality of zones; and
determine how to process each received message based on one or more rules stored in the memory and defining how a received message is to be processed by the processor based on the zone associated with the message.

8. The lighting control apparatus of claim 1,
wherein the stored configuration data represents one or more processes that, when executed by the processor, causes the processor to:
monitor the output of the motion detector over time, and
based on said monitoring, determine a threshold value for use in processing the output of the motion detector at subsequent times to determine whether motion has been detected at said subsequent times.

9. The lighting control apparatus of claim 1,
wherein the stored configuration data represents one or more processes that, when executed by the processor, causes the processor to:
monitor the output of the motion detector over time, and
based on said monitoring, determine whether the motion detector is faulty; and
if said determining determines that the motion detector is faulty, ignoring output of the motion detector at subsequent times.

10. The lighting control apparatus of claim 1,
wherein the stored configuration data represents one or more processes that, when executed by the processor, causes the processor to:
receive, via the wireless receiver, an instruction to reset a timer of the controller; and
control the power applied to the light sources based on the state of the timer,
wherein a first power is applied to the light sources when the timer has not expired, and a second power different to the first power is applied to the light sources after the timer has expired.

11. The lighting control apparatus of claim 1, wherein the stored configuration data represents at least one process that, when executed by the processor, causes the processor to:
control the transmitter to transmit one or more wireless signals representing information indicating that a parameter of interest has been detected in response to the at least one sensor detecting a parameter of interest.

12. The lighting control apparatus of claim 1, wherein the stored configuration data represents at least one process that, when executed by the processor, causes the processor to:
control the transmitter to transmit one or more wireless signals representing information indicating that a parameter of interest has been detected in response to the receiver receiving one or more wireless signals representing information indicating that a parameter of interest has been detected.

13. The lighting control apparatus of claim 1, wherein the one or more wireless signals received by the receiver representing information indicating that a parameter of interest has been detected include information representative of a separation of the apparatus from the apparatus that detected the parameter of interest.

14. The lighting control apparatus of claim 1, wherein the stored configuration data represents at least one process that, when executed by the processor, causes the processor to:
control the transmitter to transmit one or more wireless signals representing information representative of a separation of the apparatus from the apparatus that detected the parameter of interest.

15. The lighting control apparatus of claim 1, wherein the stored configuration data represents a process that, when executed by the processor, causes the processor to:
  receive, via the receiver, configuration update data representing one or more further processes to be executed by the processor; and
  modify the stored configuration data to represent the one or more further processes to be executed by the processor.

16. In a lighting control apparatus controlling one or more light sources and including:
  at least one sensor for detecting or sensing a parameter of interest;
  a transmitter for transmitting one or more wireless signals to one or more other lighting control apparatuses;
  a receiver for receiving one or more wireless signals from one or more other lighting control apparatuses; and
  a controller having at least one processor and a memory in communication with the processor to store configuration data representing one or more processes to be executed by the processor;
  a process, including:
  receiving, from one or more other lighting control apparatuses, occupancy data representative of occupancies of respective sensing regions of the one or more other lighting control apparatuses and respective separations between a sensing region of the lighting control apparatus and said sensing regions; and
  controlling the one or more light sources on the basis of the occupancies and respective separations.

17. The process of claim 16, including transmitting, via the transmitter, configuration update data representing one or more processes to be executed by one or more other lighting control apparatuses.

18. The configuration process of claim 16, including:
  receiving, via the receiver, a request for configuration information representing a configuration of the lighting control apparatus; and
  responsive to receipt of said request, transmitting the requested configuration information.

19. The process of claim 16, including:
  determining a dwell time for determining when to dim or turn off the light sources in the absence of occupancy of the sensing region of the lighting control apparatus, the dwell time being determined on the basis of the separations between said sensing region of the lighting control apparatus and the sensing regions of the one or more other lighting control apparatuses.

20. The process of claim 16, including:
receiving, via the receiver, a request to test wireless communications between said lighting control apparatus and one or more other lighting control apparatuses;
controlling the one or more light sources to provide a visual indication that the request was received by said lighting control apparatus; and
transmitting, via the transmitter, a corresponding request to test wireless communications for receipt by one or more other lighting control apparatuses.

21. The process of claim 16, including:
(i) receiving, via the receiver, a request to test wireless communications between said lighting control apparatus and one or more other lighting control apparatuses;
(ii) transmitting, via the transmitter and at a corresponding selected wireless transmission power, a test message for receipt by one or more other lighting control apparatuses;
(iii) receiving, via the receiver, response messages confirming receipt of the test message from one or more other lighting control apparatuses;
(iv) repeating steps (ii) and (iii) for respective different wireless transmission powers; and
(v) processing the received response messages and data representing the corresponding wireless transmission powers to select a wireless transmission power for use in subsequent wireless transmissions by the transmitter.

22. The process of claim 16, including:
transmitting, via the transmitter, messages to one or more other lighting control apparatuses, each transmitted message including zone data identifying the node as being a member of at least one corresponding zone of a plurality of zones;
receiving, via the wireless receiver, messages from one or more other lighting control apparatuses, each received message including zone data identifying a corresponding one of said plurality of zones; and
determining how to process each received message based on one or more rules stored in the memory and defining how a received message is to be processed by the processor based on the zone associated with the message.

* * * * *